(12) United States Patent
Kamata

(10) Patent No.: US 7,925,714 B2
(45) Date of Patent: Apr. 12, 2011

(54) REMOTE OPERATION PROGRAM, METHOD AND TERMINAL APPARATUS

(75) Inventor: Hajime Kamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1203 days.

(21) Appl. No.: 11/285,182

(22) Filed: Nov. 23, 2005

(65) Prior Publication Data

US 2007/0050503 A1    Mar. 1, 2007

(30) Foreign Application Priority Data

Aug. 25, 2005   (JP) ................................ 2005-243981

(51) Int. Cl.
*G06F 15/16* (2006.01)
*G06F 15/173* (2006.01)
*G06F 17/25* (2006.01)

(52) U.S. Cl. ......... 709/217; 709/225; 715/248; 715/250

(58) Field of Classification Search .................... 709/223
See application file for complete search history.

(56) References Cited

U.S. PATENT DOCUMENTS

| | | | | |
|---|---|---|---|---|
| 5,216,706 A * | 6/1993 | Nakajima | ................. | 379/102.02 |
| 5,257,069 A * | 10/1993 | Hirata et al. | ....................... | 399/8 |
| 5,652,803 A * | 7/1997 | Tachikawa et al. | ............ | 382/135 |
| 5,659,628 A * | 8/1997 | Tachikawa et al. | ............ | 382/135 |
| 5,896,203 A * | 4/1999 | Shibata | .......................... | 358/404 |
| 6,038,376 A * | 3/2000 | Noguchi | ....................... | 358/1.15 |
| 6,107,768 A * | 8/2000 | Ouchi et al. | ............... | 318/568.1 |
| 7,058,391 B2 * | 6/2006 | Tani | ................................ | 455/411 |
| 7,403,204 B2 * | 7/2008 | Emerson et al. | .............. | 345/545 |
| 7,486,970 B2 * | 2/2009 | Kim et al. | ....................... | 455/566 |
| 2004/0201471 A1 * | 10/2004 | Primm et al. | .................. | 340/506 |
| 2005/0144251 A1 * | 6/2005 | Slate | .............................. | 709/215 |
| 2005/0198214 A1 * | 9/2005 | Inoue | ............................. | 709/219 |
| 2006/0085532 A1 * | 4/2006 | Chu et al. | ...................... | 709/223 |
| 2006/0238339 A1 * | 10/2006 | Primm et al. | .................. | 340/540 |
| 2008/0108323 A1 * | 5/2008 | Abe et al. | ....................... | 455/411 |

FOREIGN PATENT DOCUMENTS

| | | |
|---|---|---|
| JP | 11-331199 | 11/1999 |
| JP | 2000-315103 | 11/2000 |
| JP | 2001-331428 | 11/2001 |
| JP | 2005-140656 | 6/2005 |

OTHER PUBLICATIONS

Japanese Office Action issued May 11, 2010 in corresponding Japanese Patent Application 2005-243981.

* cited by examiner

*Primary Examiner* — Patrice L Winder
*Assistant Examiner* — Ebrahim Golabbakhsh
(74) *Attorney, Agent, or Firm* — Staas & Halsey LLP

(57) ABSTRACT

A remote-operated unit of a user terminal apparatus remote-operated through network from a remote terminal apparatus of a support staff sends image information of a changed portion to the remote terminal apparatus to display a business screen in an interlocked manner when a change is detected in the business screen displayed by a business processing unit with an image-information transmission unit. When an operation-information reception unit receives remote operation information of a mouse or keyboard from the remote terminal apparatus, a remote-operation prohibited region management unit refers to a remote-operation prohibited region table and prohibits remote operation if the remote operation information is within the operation prohibited region.

14 Claims, 18 Drawing Sheets

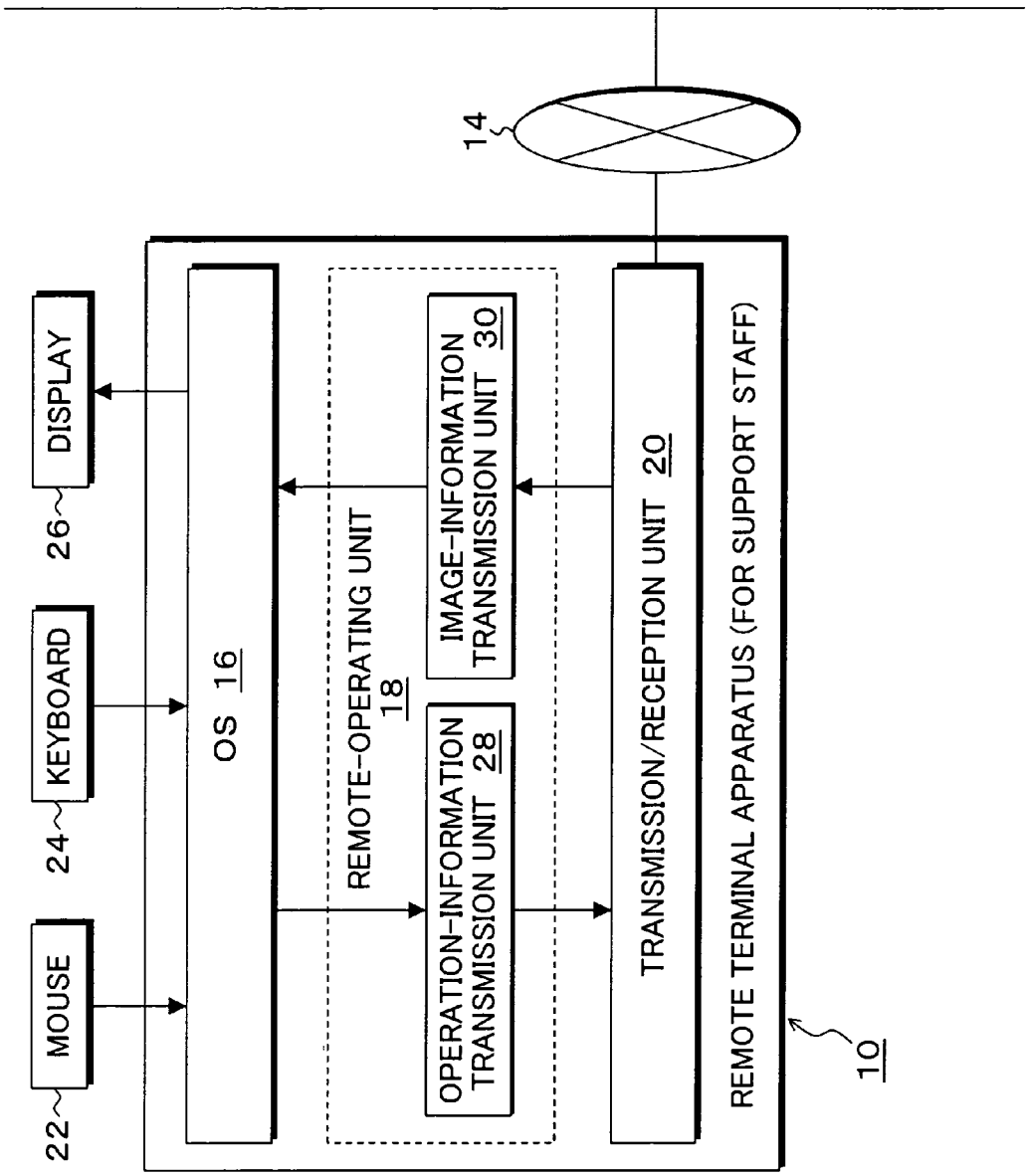

FIG. 3

| REGION NUMBER | REMOTE-OPERATION PROHIBITED REGION (UPPER LEFT COORDINATES) | (LOWER RIGHT COORDINATES) |
|---|---|---|
| #1 | $(X_{1S}, Y_{1S})$ | $(X_{1E}, Y_{1E})$ |
| #2 | $(X_{2S}, Y_{2S})$ | $(X_{2E}, Y_{2E})$ |
| #3 | $(X_{3S}, Y_{3S})$ | $(X_{3E}, Y_{3E})$ |
| ⋮ | ⋮ | ⋮ |
| #n | $(X_{nS}, Y_{nS})$ | $(X_{nE}, Y_{nE})$ |

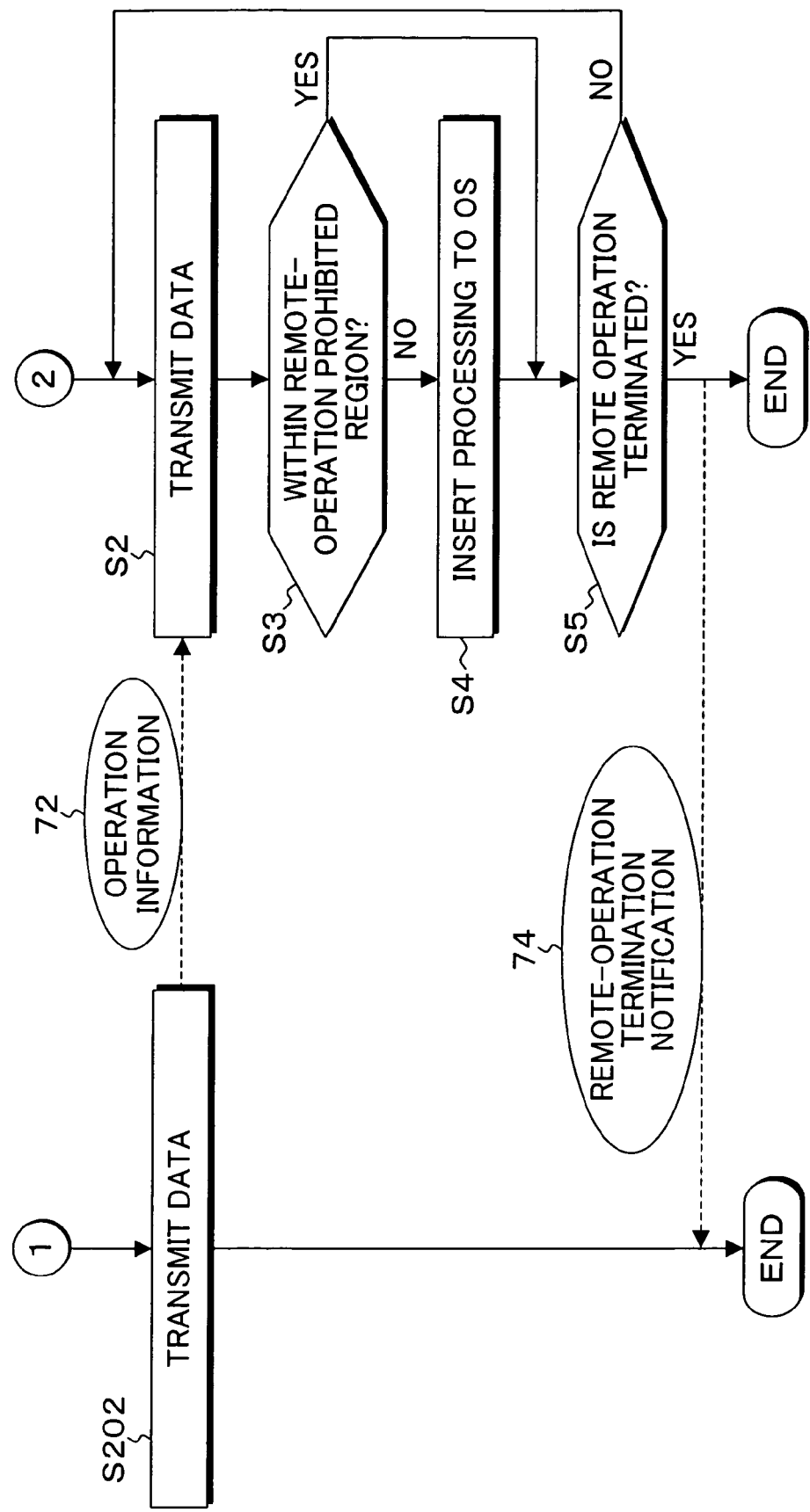

FIG. 8

| 84 | 54 | 52 | 55 |
|---|---|---|---|
| SCREEN NUMBER | REGION NUMBER | REMOTE-OPERATION PROHIBITED REGION (UPPER LEFT COORDINATES) | (LOWER RIGHT COORDINATES) |
| #1 | #1 | $(X_{11S}, Y_{11S})$ | $(X_{11E}, Y_{11E})$ |
| #1 | #2 | $(X_{12S}, Y_{12S})$ | $(X_{12E}, Y_{12E})$ |
| #1 | ⋮ | ⋮ | ⋮ |
| #2 | #1 | $(X_{21S}, Y_{21S})$ | $(X_{21E}, Y_{21E})$ |
| #2 | #2 | $(X_{22S}, Y_{22S})$ | $(X_{22E}, Y_{22E})$ |
| #2 | ⋮ | ⋮ | ⋮ |
| ⋮ | ⋮ | ⋮ | ⋮ |
| #m | #1 | $(X_{m1S}, Y_{m1S})$ | $(X_{m1E}, Y_{m1E})$ |
| #m | #2 | $(X_{m2S}, Y_{m2S})$ | $(X_{m2E}, Y_{m2E})$ |
| #m | ⋮ | ⋮ | ⋮ |

| SCREEN NUMBER 84 | SCREEN IDENTIFICATION CHARACTERS 88 | SCREEN IDENTIFICATION CHARACTER COORDINATES 90 | REGION NUMBER 54 | REMOTE-OPERATION PROHIBITED REGION 55 | |
|---|---|---|---|---|---|
| | | | | (UPPER LEFT COORDINATES) | (LOWER RIGHT COORDINATES) |
| #1 | SAVING DEPOSIT | $(X_{11}, Y_{11})$ | #1 | $(X_{11S}, Y_{11S})$ | $(X_{11E}, Y_{11E})$ |
| #1 | SAVING DEPOSIT | $(X_{11}, Y_{11})$ | #2 | $(X_{12S}, Y_{12S})$ | $(X_{12E}, Y_{12E})$ |
| #1 | SAVING DEPOSIT | ... | ... | ... | ... |
| #2 | FIXED DEPOSIT | $(X_{21}, Y_{21})$ | #1 | $(X_{21S}, Y_{21S})$ | $(X_{21E}, Y_{21E})$ |
| #2 | FIXED DEPOSIT | $(X_{21}, Y_{21})$ | #2 | $(X_{22S}, Y_{22S})$ | $(X_{22E}, Y_{22E})$ |
| #2 | FIXED DEPOSIT | ... | ... | ... | ... |
| ...... | ...... | ...... | ...... | ...... | ...... |
| #m | ASSET BUILDING SAVINGS | $(X_{m1}, Y_{m1})$ | #1 | $(X_{m1S}, Y_{m1S})$ | $(X_{m1E}, Y_{m1E})$ |
| #m | ASSET BUILDING SAVINGS | $(X_{m1}, Y_{m1})$ | #2 | $(X_{m2S}, Y_{m2S})$ | $(X_{m2E}, Y_{m2E})$ |
| #m | ASSET BUILDING SAVINGS | ... | ... | ... | ... |

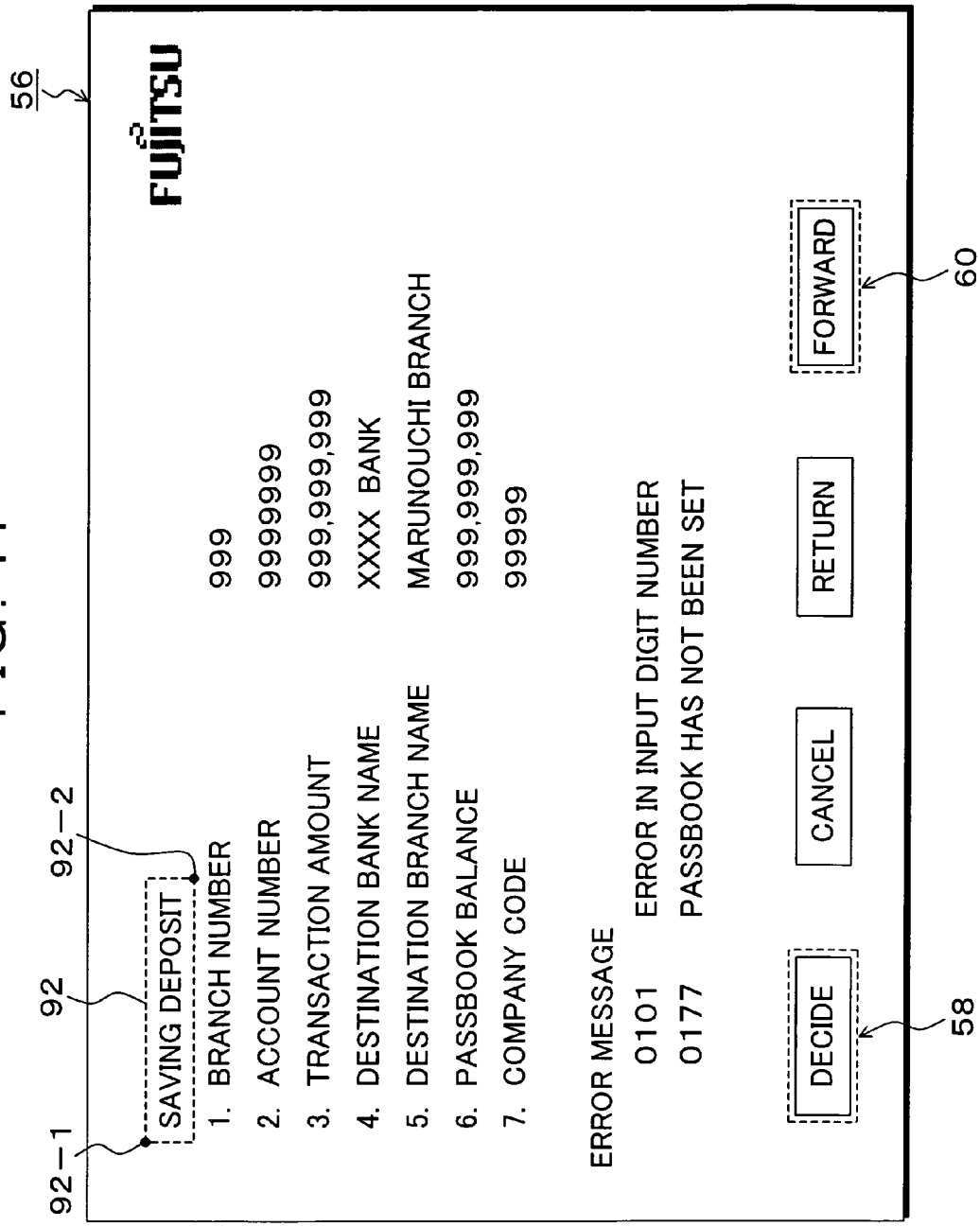

FIG. 13

| SCREEN NUMBER 84 | SCREEN IDENTIFICATION IMAGE 94 | SCREEN IDENTIFICATION IMAGE COORDINATES 96 | REGION NUMBER 54 | REMOTE-OPERATION PROHIBITED REGION 52 | |
|---|---|---|---|---|---|
| | | | | (UPPER LEFT COORDINATES) | (LOWER RIGHT COORDINATES) 55 |
| #1 | (image) | $(X_{11}, Y_{11})$ | #1 | $(X_{11S}, Y_{11S})$ | $(X_{11E}, Y_{11E})$ |
| #1 | (image) | $(X_{11}, Y_{11})$ | #2 | $(X_{12S}, Y_{12S})$ | $(X_{12E}, Y_{12E})$ |
| #1 | (image) | ... | ... | ... | ... |
| #2 | FUJITSU | $(X_{21}, Y_{21})$ | #1 | $(X_{21S}, Y_{21S})$ | $(X_{21E}, Y_{21E})$ |
| #2 | FUJITSU | $(X_{21}, Y_{21})$ | #2 | $(X_{22S}, Y_{22S})$ | $(X_{22E}, Y_{22E})$ |
| #2 | FUJITSU | ... | ... | ... | ... |
| ... | ... | ... | ... | ... | ... |
| #m | SEARCH | $(X_{m1}, Y_{m1})$ | #1 | $(X_{m1S}, Y_{m1S})$ | $(X_{m1E}, Y_{m1E})$ |
| #m | SEARCH | $(X_{m1}, Y_{m1})$ | #2 | $(X_{m2S}, Y_{m2S})$ | $(X_{m2E}, Y_{m2E})$ |
| #m | SEARCH | ... | ... | ... | ... |

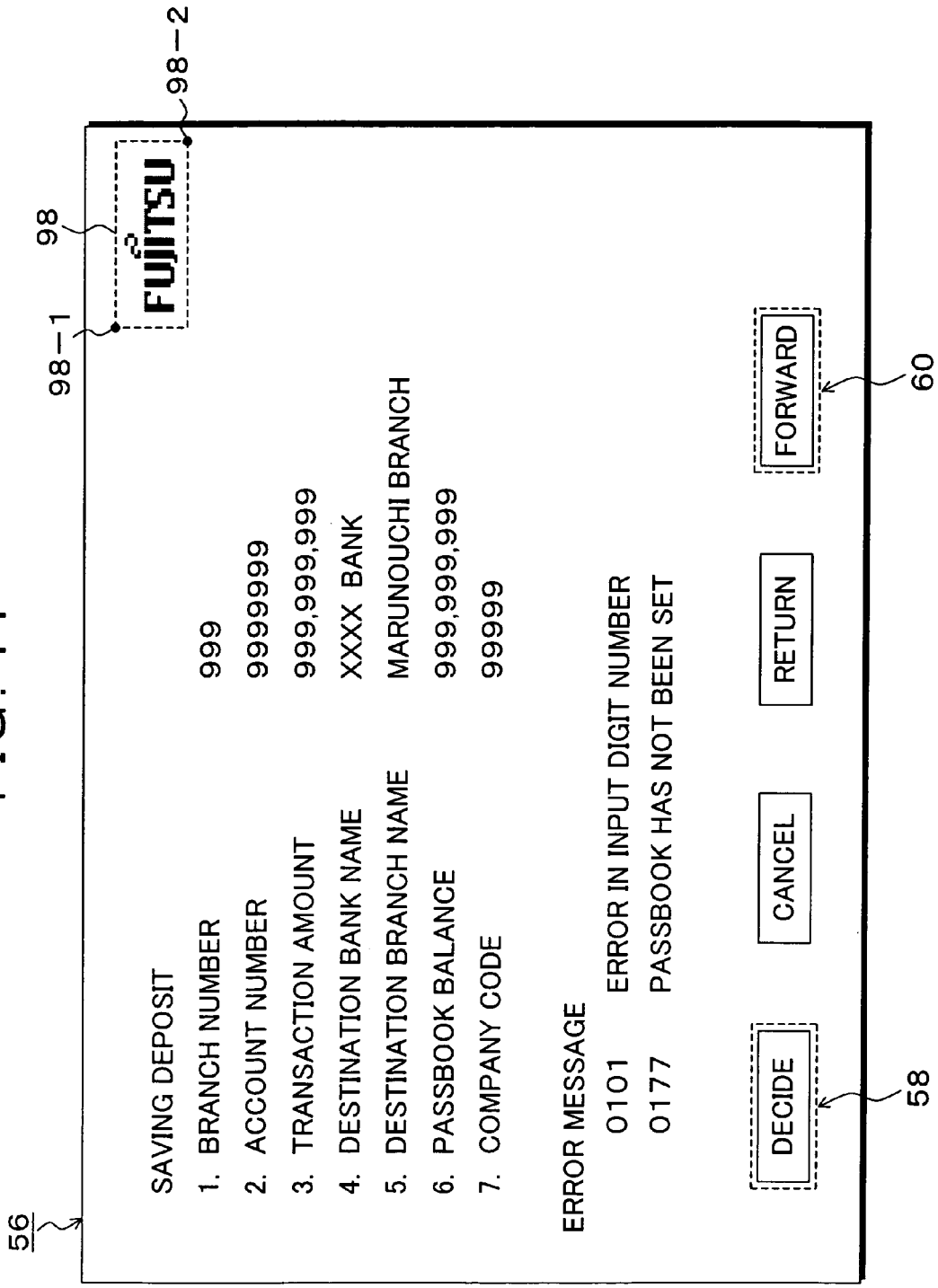

REMOTE OPERATION PROGRAM, METHOD AND TERMINAL APPARATUS

CROSS-REFERENCE TO RELATED APPLICATION

This application claims the benefit of priority to prior application No. JP2005-243981, filed Aug. 25, 2005 in Japan, of which full contents are incorporated herein by reference.

BACKGROUND OF THE INVENTION

1. Field of the Invention

The present invention relates generally to a remote operation program, method and terminal apparatus used for support operation of personal computers and, more particularly, to a remote operation program, method and terminal apparatus remote-operated through network from a remote terminal apparatus.

2. Description of the Related Art

Recently, in finance-related industry sectors including banks, dedicated terminals are changed rapidly to personal computers. Although business programs for such personal computers can achieve easy-to-use user interfaces, version upgrades and the like are frequently needed due to function addition of business programs in order to provide customer-oriented products and services. Therefore, as the increasing case in banks and the like, a support stuff in a bank remotely monitors and operates screens of personal computers of bank clerks taking care of customers to provide operation guidance or solve troubles of business programs.

However, in such a conventional remote operation system, especially, a remote operation system for industry sectors concerning money, if it is risky to allow a support staff to perform remote operation unconditionally, the operation is conducted with a setup for allowing a support staff to watch screens only and banning remote operation. Although such operation is effective in preventing a malicious support staff from performing dishonest operation, it is problematic that normal support efficiency is also reduced.

SUMMARY OF THE INVENTION

It is therefore an object of the present invention to provide a remote operation program, method and terminal apparatus for ensuring the prevention of the dishonest operation without reducing the support efficiency.

The present invention provides a remote operation program. The remote operation program of the present invention is characterized by forcing a computer of a terminal apparatus on the user side remote-operated through network from a remote terminal apparatus to execute:

an image information transmission step of sending image information of a changed portion to the remote terminal apparatus to display a business screen in an interlocked manner when a change is detected in the business screen displayed by business processing (business program);

an operation information reception step of receiving remote operation information from the remote terminal apparatus; and an operation prohibited region management step of setting a remote-operation prohibited region for the remote terminal apparatus on the business screen and for prohibiting operation by the remote terminal if the remote operation information received in the operation information reception step is within the remote-operation prohibited region. The operation prohibited region management step registers into a table the remote-operation prohibited region notified every time the business screen is switched and displayed by business processing, and discards the remote operation information if the remote operation information received in the operation information reception step is within the remote-operation prohibited region registered in the table, or executes processing based on the remote operation information if the remote operation information is outside of the remote-operation prohibited region.

In another form, the operation prohibited region management step preliminarily registers into a table a screen identifier being able to identify at least a business screen, and the remote-operation prohibited region for each business screen displayed by the business processing, and reads out the remote-operation prohibited region of a corresponding business screen from the table with the screen identifier notified every time the business screen is switched and displayed by business processing to discard the remote operation information if the remote operation information received in the operation information reception step is within the remote-operation prohibited region, or to execute processing based on the remote operation information if the remote operation information is outside of the remote-operation prohibited region. The operation prohibited region management step uses a screen number as the screen identifier. In another form, the operation prohibited region management step preliminarily registers screen identification information on a screen being able to identify at least a business screen, coordinate information identifying a display position of the screen identification information and the remote-operation prohibited region for prohibiting remote operation into a table for each business screen displayed by business processing, and reads out the corresponding remote-operation prohibited region by comparing screen identification information extracted from the business screen with the screen identification information in the table every time the business screen is switched and displayed by business processing to discard the remote operation information if the remote operation information received in the operation information reception step is within the remote-operation prohibited region, or to execute processing based on the remote operation information if the remote operation information is outside of the remote-operation prohibited region. In this case, the operation prohibited region management step uses a screen identification character string which can identify the business screen as the screen identification information. Also, the operation prohibited region management step can use a screen identification image which can identify the business screen as the screen identification information. In the operation prohibited region management step, existence of the remote-operation prohibited region is recognized and displayed on the business screen. For example, as the recognizable display of the remote-operation prohibited region on the business screen, the operation prohibited region management step performs setup of specific color, blind display or display of a mouse cursor changed to a non-operational shape.

The present invention provides a remote operation method. The present invention is a remote operation method of a terminal apparatus on the user side remote-operated through network from a remote terminal apparatus, characterized by forcing a computer of a terminal apparatus on the user side to execute:

an image information transmission step of sending image information of a changed portion to the remote terminal apparatus to display a business screen in an interlocked manner when a change is detected in the business screen displayed by business processing;

an operation information reception step of receiving remote operation information from the remote terminal apparatus; and an operation prohibited region management step of setting a remote-operation prohibited region for the remote terminal apparatus on the business screen and for prohibiting operation by the remote terminal if the remote operation information received in the operation information reception step is within the remote-operation prohibited region.

The present invention provides a remote-operated terminal. In other words, the present invention is characterized by a terminal apparatus remote-operated through network from a remote terminal apparatus, comprising of:

an image information transmission unit for sending image information of a changed portion to the remote terminal apparatus to display a business screen in an interlocked manner when a change is detected in the business screen displayed by business processing;

an operation information reception unit for receiving remote operation information from the remote terminal apparatus; and an operation prohibited region management unit for setting a remote-operation prohibited region for the remote terminal apparatus on the business screen and for prohibiting operation by the remote terminal if the remote operation information received by the operation information reception unit is within the remote-operation prohibited region.

Details of the remote operation method and terminal are basically the same as the case of the remote operation program according to the present invention. According to the present invention, by dynamically setting on a supported terminal apparatus on the user side a remote-operation prohibited region where a support staff is prohibited from performing remote operation on a reception screen from an end user, since remote operation can be made unable, for example, for certain buttons displayed on a business screen by a business screen for which dishonest operation is desired to be avoided and since a screen region remote-operated by the support staff can be limited, while ensuring security and prevention of dishonest acts, an advantage can be achieved by accelerating support operation with remote operation. Also, by preliminary registering into a table the remote-operation prohibited regions of the business screens along with identification information of the business screens, since screen identification information can be extracted from a currently displayed business screen without receiving notification of a screen number or remote-operation prohibited region from a business processing program and since it can be decided whether remote operation is performed or not by obtaining a corresponding remote-operation prohibited region from the table, a remote operation program of the present invention can be easily implemented without changing the business processing program.

BRIEF DESCRIPTION OF THE DRAWINGS

FIGS. 1A and 1B are functional block diagrams of a remote system according to the present invention;

FIG. 3 is an explanatory view of an operation prohibited region table used in a first embodiment of the present invention;

FIGS. 5A and 5B are time charts of first embodiment of the present invention in accordance with the remote-operated unit of FIGS. 1A and 1B;

FIG. 8 is an explanatory view of an operation prohibited region table used in a second embodiment of the present invention;

FIG. 10 is an explanatory view of an operation prohibited region table used in a third embodiment of the present invention;

FIG. 11 is an explanatory view of a business screen extracting a screen identification character string;

FIG. 13 is an explanatory view of an operation prohibited region table used in a fourth embodiment of the present invention;

FIG. 14 is an explanatory view of a business screen extracting a screen identification image.

DESCRIPTION OF THE PREFERRED EMBODIMENT

Figure 1B:
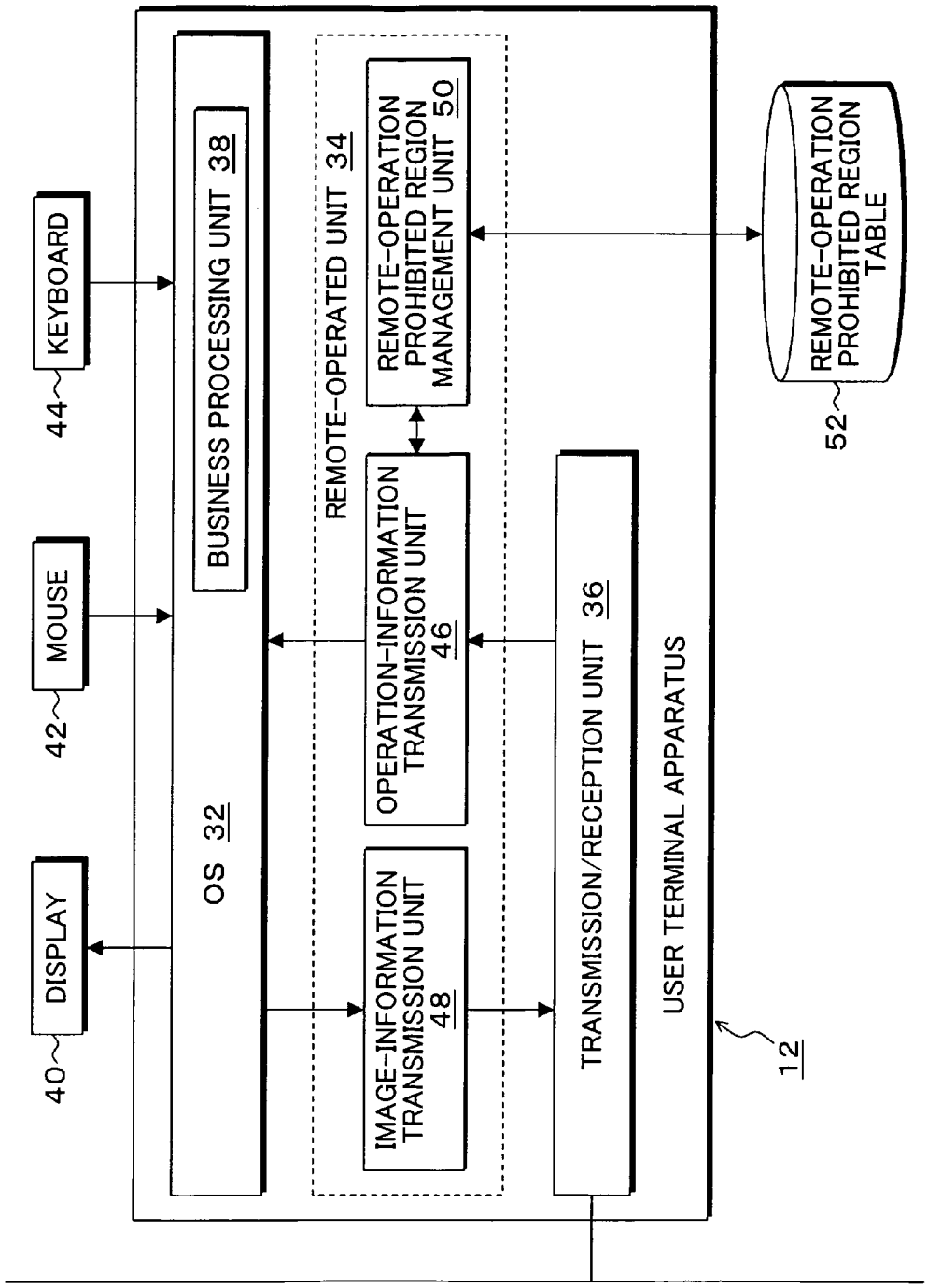

FIGS. 1A and 1B are functional block diagrams of a remote operation system according to the present invention. In FIGS. 1A and 1B, the remote operation system is constituted by a remote terminal apparatus 10 used by a support staff and a user terminal apparatus 12 used by an end user, both of which are connected via network 14. In FIGS. 1A and 1B, although one (1) remote terminal apparatus 10 and one (1) user terminal apparatus 12 are shown in order to facilitate the description, an actual system is constituted by pluralities of the remote terminal apparatuses 10 and the user terminal apparatuses 12. The remote terminal apparatus 10 used by a support staff is provided with an OS (Operating System) 16, a remote-operating unit 18, transmission/reception unit 20, mouse 22, keyboard 24 and display 26. The remote-operating unit 18 is provided with functions of an operation-information transmission unit 28 and image-information reception unit 30. On the other hand, the user terminal apparatus 12 is provided with an OS 32, a remote-operated unit 34, transmission/reception unit 36, mouse 42 and keyboard 44. The remote-operated unit 34 of the user terminal apparatus 12 is provided with functions of an image-information transmission unit 48 and operation-information reception unit 46 as well as a function of a remote-operation prohibited region management unit 50 provided additionally according to the present invention, and a remote-operation prohibition management table 52 is connected to the remote-operation prohibited region management unit 50. In this embodiment, although a description is made by taking the mice 22, 42 and keyboards 24, 44 as an example of devices operated on the remote terminal apparatus 10 and user terminal apparatus 12 by the support staff and end user, the devices may be any devices such as a pen, track ball, track pad, tablet and the like as long as the devices are pointing devices. Then, a description is made for a basic mechanism of the remote-operation software in the remote operation system of FIGS. 1A and 1B. The remote-operation software is achieved by installing and executing each of a program achieving the function of the remote-operating unit 18 of the remote terminal apparatus 10 and a program achieving the function of the remote-operated unit 34 of the user terminal apparatus 12; the operation-information transmission unit 28 and image-information reception unit 30 carry out functions in the remote-operating unit 18 of the remote terminal apparatus 10; and the operation-information reception unit 46 and image-information transmission unit 48 carry out functions in the remote-operated unit 34 of the user terminal apparatus 12. In the case of remote operation by the support staff using the remote terminal apparatus 10, business processing is performed by a business processing unit 38 which is a business program of the user terminal apparatus 12, and a suitable business screen is displayed on a display 40. For the business screen displayed on the display 40, image information is compressed by the image-information transmission unit 48, sent from the transmission/reception unit 36 to the transmission/reception unit 20 of the remote terminal apparatus 10 via the network 14, and received and extended by the image-information reception unit 30 to display on the display 26 via the OS 16 in an interlocked manner. For the image information displayed on the display 40 at the start, all the image information is compressed and sent to the remote terminal apparatus 10 side, however, for the image information after that, only changed image information is compressed and sent to be displayed in an interlocked manner. When the support staff watches a business screen of the user terminal apparatus 12 displayed on the display 26 of the remote terminal apparatus 10 in an interlocked manner and performs operation of the mouse 22 or keyboard 24 necessary for supporting, the operation of the mouse 22 or keyboard 24 is supplied to the operation-information transmission unit 28 via the OS 16, sent from the transmission/reception unit 20 to the user terminal apparatus 12 via the network 14, received by the transmission/reception unit 36, and then output from the operation-information reception unit 46. The operation-information reception unit 46 passes to the OS 32 the operation information of the mouse of keyboard received from the remote terminal apparatus 10, and in response to this, the business processing unit 38 performs processing corresponding to the operation of the mouse or keyboard to reflect the result to the business screen of the display 40. When the business screen is changed on the display 40, the changed portion is detected by the image-information transmission unit 48, and the image information of the changed portion is data-compressed, sent from the transmission/reception unit 36 to the remote terminal apparatus 10 via the network 14, and supplied from the transmission/reception unit 20 to the image-information reception unit 30 to extend the compressed image information to display the image information of the changed portion on the display 26 via the OS 16. In addition to such basic processing of the remote-operation software, in the present invention, the remote-operation prohibited region management unit 50 provided on the remote-operated unit 34 of the user terminal apparatus 12 registers and manages remote-operation prohibited regions for the business screen displayed on the display 40 by the business operation unit 38 and, when receiving the operation information of the mouse or keyboard from the remote terminal apparatus 10 with the operation-information reception unit 46, the operation by the remote terminal apparatus 10 is prohibited if the operation is within the prohibited region registered in the remote-operation prohibited region table 52. As a method for managing the remote-operation prohibited regions by the remote-operation prohibited region management unit 50, two (2) types exist as follows.

(1) business-program dependent
(2) business-program independent

In the business-program dependent management method, when the business operation unit 38 displays the business screen on the display 40, the remote-operation prohibited region is notified from the business program side and registered into the table, and the remote-operation prohibited region registered into the table is compared with the operation information of the mouse and keyboard from the remote terminal received by the operation-information reception unit 46 to decide whether the remote operation is prohibited or not. On the other hand, in the case of the business-program independent management method, the remote-operation prohibited region is preliminary registered into the remote-operation prohibited region table 52 for each business screen displayed by the business operation unit 38 and, when the business operation unit 38 displays a business screen on the display 40, necessary identification information is extracted from the displayed business screen in order to identify the screen and the corresponding remote-operation prohibited region is obtained by referring to the table, which is compared with the operation information of the mouse and keyboard from the remote terminal apparatus 10 received by the operation-information reception unit 46 to decide whether the remote operation is prohibited or not. As an intermediate method between the business-program dependent and business-program independent methods, a screen identifier, for example, a screen number may be notified from the business program and the remote-operation prohibition information may be preliminary registered into a table for each screen. These business-program dependent, business-program independent and intermediate methods are specifically described later as a first embodiment to fourth embodiment.

Figure 2:
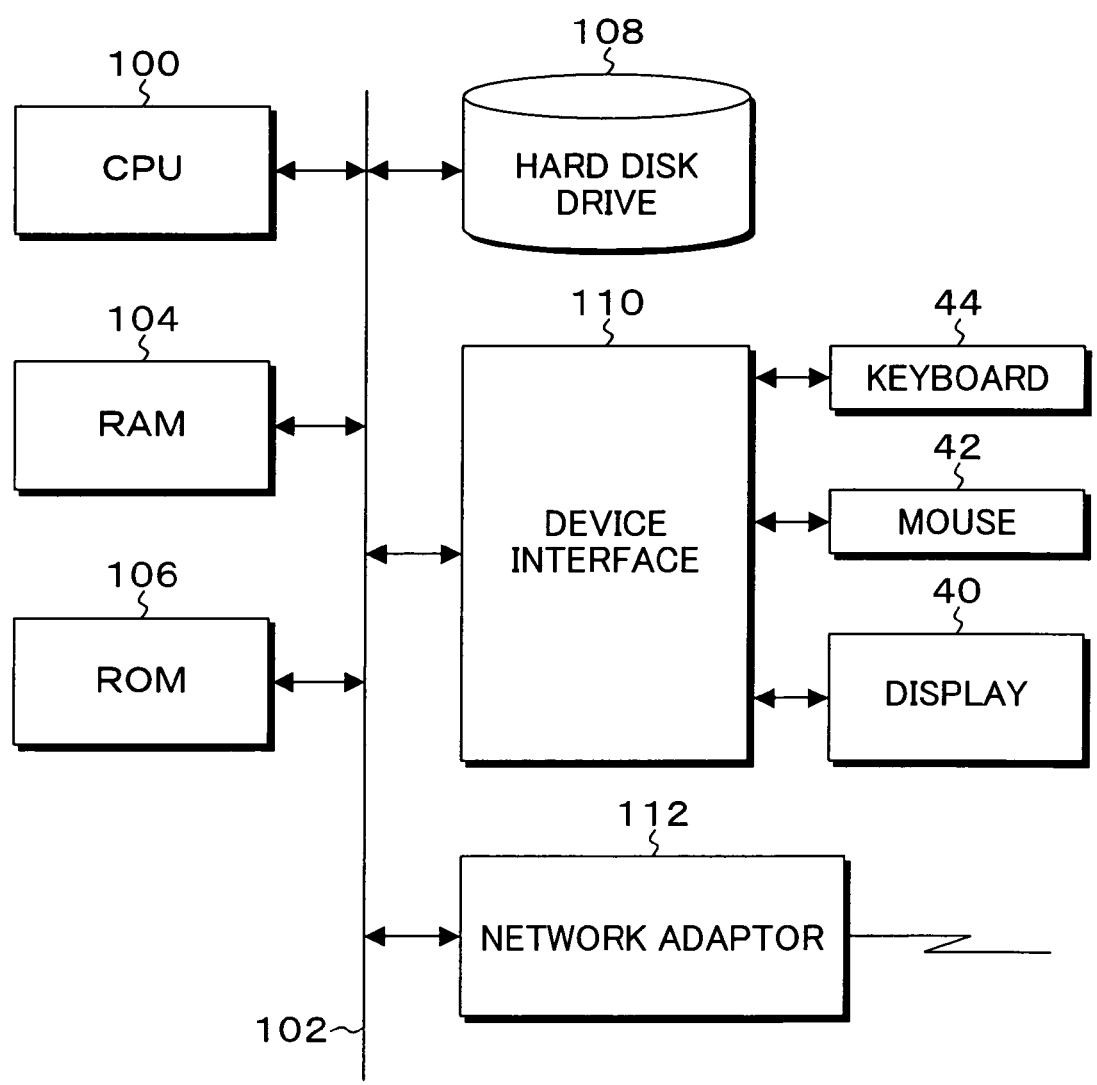
FIG. 2 is a block diagram of a hardware environment of a computer realizing the user terminal of FIGS. 1A and 1B.

FIG. 2 is a block diagram of a hardware environment of a computer for realizing the user terminal apparatus 12 of FIGS. 1A and 1B. In FIG. 2, the computer is provided with a CPU (Central Processing Unit) 100, and a bus from the CPU 100 is connected to a RAM (Random Access Memory) 104, ROM 106, hard disk drive 108, device interface 110 and network adaptor 112. The device interface 110 is connected with a keyboard 44, mouse 42 and display 40. In the user terminal apparatus 12 of FIGS. 1A and 1B, the hard disk drive 108 stores a program for achieving the function of the remote-operated unit 34 of the present invention and a business program for achieving the function of the business processing unit 38, which are read out from the hard disk drive 108 to be deployed on the RAM 104 and executed by the CPU 100 when the computer is booted. The network adaptor 112 corresponds to the transmission/reception unit 36 provided on the user terminal apparatus 12 of FIGS. 1A and 1B and controls communication with the remote terminal apparatus 10 via network. Such a hardware environment of the computer of FIG. 2 is the same as the remote terminal apparatus 10 of FIGS. 1A and 1B used by a support staff. Then, a first embodiment of the remote operation according to the present invention is described with reference to FIG. 3 to FIGS. 5A and 5B. The first embodiment is a business-program dependent method such that the remote-operation prohibited region management unit 50 provided on the remote-operated unit 34 of the user terminal apparatus 12 of FIGS. 1A and 1B registers and uses the registration content of the remote-operation prohibited region table 52 notified from a business program achieving the function of the business operation unit 38.

FIG. 3 is an explanatory view of a remote-operation prohibited region table 52 used in the first embodiment of the present invention. The remote-operation prohibited region table 52 is prepared correspondingly to a business screen currently displayed on the display 40 and is constituted by region numbers 54 and remote-operation prohibited regions 55. As the region numbers 54, for example, consecutive numbers from #1 to #n are added correspondingly to a plurality of the remote-operation prohibited regions set onto one (1) business screen. As the remote-operation prohibited regions 55, upper-left coordinates and lower-right coordinates are registered for a rectangular area constituting each remote-operation prohibited region specified by the region number #1 to #n.

Figure 4:
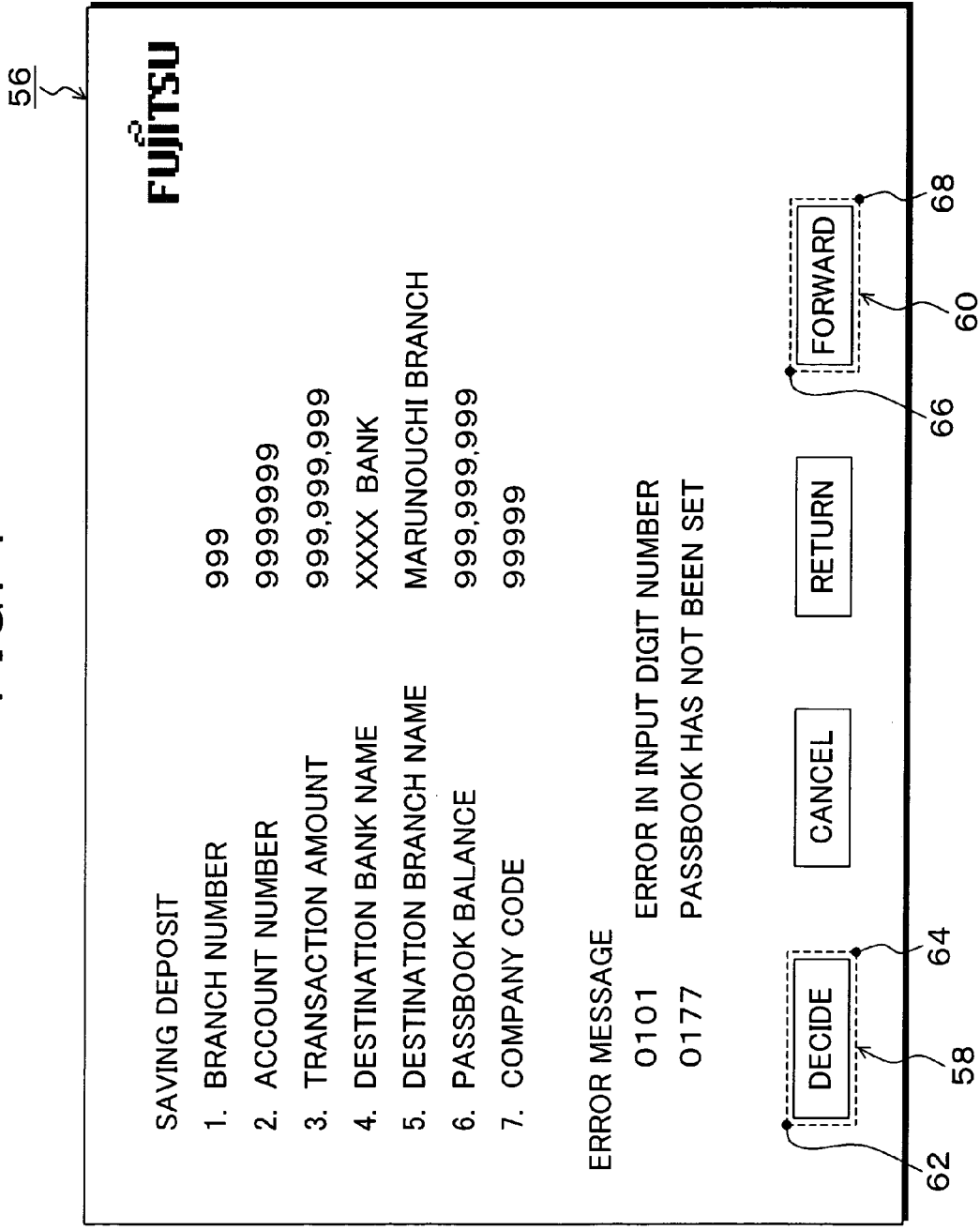
FIG. 4 is an explanatory view of a business screen to which remote-operation prohibited regions are set.

FIG. 4 is an explanatory view of a business screen 56 to which the remote-operation prohibited region is set. A business screen for "saving deposit" in banking business is taken as an example of the business screen 56 which displays, correspondingly to "saving deposit", a branch number, an account number, a transaction amount, destination bank name, destination branch name, passbook balance and company code as well as error messages as needed, and "decide", "cancel", "return" and "forward" are disposed as operation buttons on the under side thereof. Among the operation buttons, for example, "decide" and "forward" are set as the operation buttons to which the support staff is prohibited from performing remote operation. To the operation buttons "decide" and "forward", remote-operation prohibited regions 58, 60 are set, as shown by dotted lines. Specifically, for the remote-operation prohibited region 58, an upper-left coordinate point 62 and a lower-right coordinate point 64 are registered into the remote-operation prohibited region 55 of FIG. 3 correspondingly to the region number. Also, for the operation button "forward", the remote-operation prohibited region 60 is set as shown by dotted line, and respective coordinates of an upper-left coordinate point 66 and a lower-right coordinate point 68 are registered into the remote-operation prohibited region 55 of FIG. 3 correspondingly to the region number 54. In registration of the remote-operation prohibited region table 52 of FIG. 3, the registration into the table is performed by notifying the remote-operated unit 34 of respective coordinates of the upper-left coordinate points 62, 66 and the lower-right coordinate points 64, 68 as shown by the remote-operation prohibited regions 58, 60 of FIG. 4 via an application program interface (API) of a remote-operated program achieving the remote-operated unit 34, every time the business program achieving the business processing unit 38 displays the business screen 56 such as FIG. 4, for example. Once such registration of the remote-operation prohibited region table 52 is performed correspondingly to the business screen currently displayed, when receiving the operation information of the mouse 22 or keyboard 24 from the remote terminal apparatus 10 with the operation-information reception unit 46 in this state, the remote operation information is compared with respective region coordinates of the remote-operation prohibited regions 55 registered into the table and is discarded without passing to the OS 32 if the remote operation information is within any remote-operation prohibited region or is passed to the OS 32 if the remote operation information is outside of the remote-operation prohibited regions.

Figure 5A:
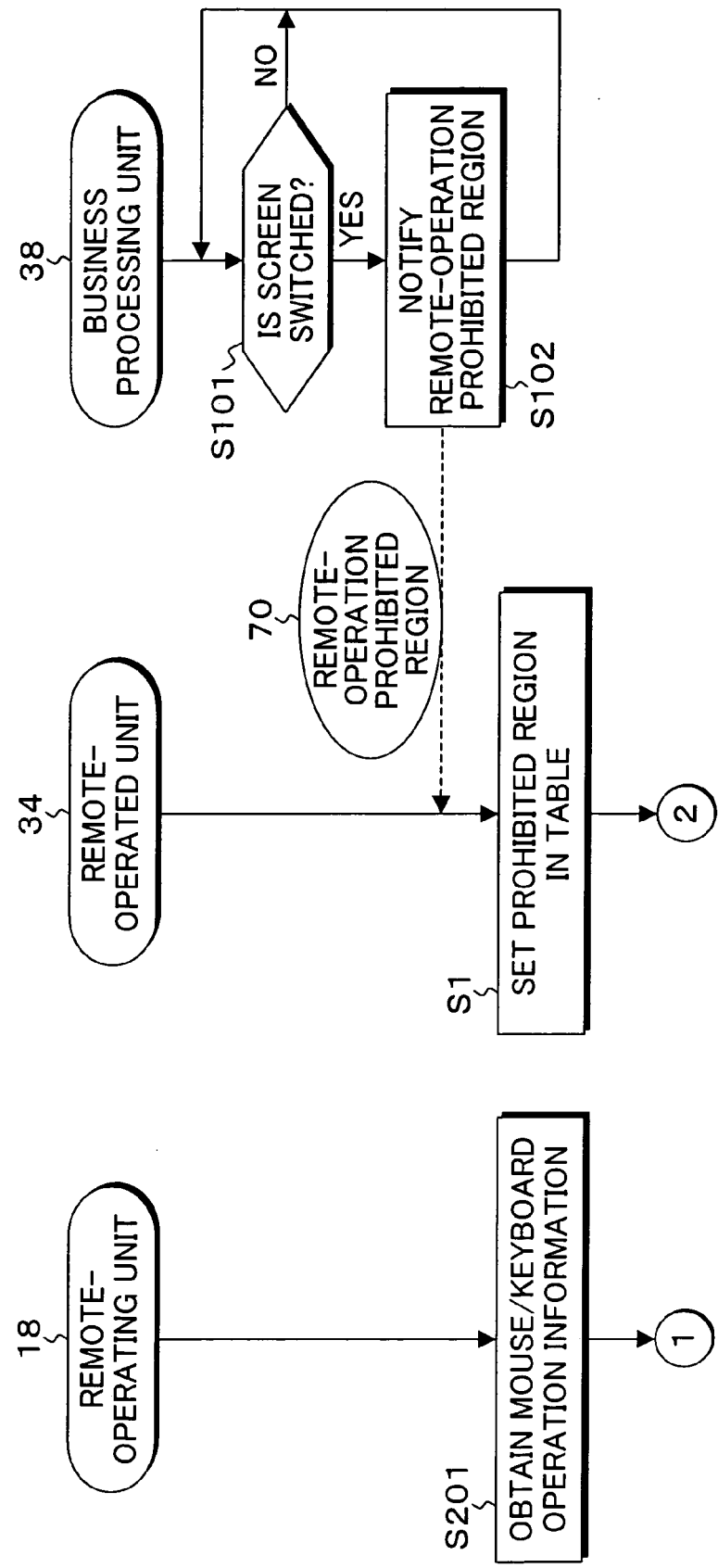

FIGS. 5A and 5B are time charts showing a processing procedure of the first embodiment of the present invention by the remote-operated unit 34 of FIGS. 1A and 1B. In FIGS. 5A and 5B, the business processing unit 38 of the user terminal apparatus 12 determines that a business screen is switched in step S101 and notifies the remote-operated unit 34 of a remote-operation prohibited region 70 on the business screen after the switching in step S102. Specifically, this remote-operation prohibited region is upper-left coordinates and lower-right coordinates of each prohibited region. The remote-operated unit 34 is notified of the remote-operation prohibited region 70 from the business processing unit 38 and sets and registers the notified remote-operation prohibited region into the remote-operation prohibited region table 52 in step S1. In the remote-operating unit 18 of the remote terminal apparatus 10 used by the support staff, when the operation necessary for supporting is performed with the mouse 22 or keyboard 24 while watching a screen of the display 26 which is an interlocked display of the business screen displayed on the display 40 of the user terminal apparatus 12, the operation is obtained as the operation information of the mouse or keyboard in step S201, and the operation information 72 of the mouse or keyboard is transmitted to the remote-operated unit 34 of the user terminal apparatus 12 by the function of the operation-information transmission unit 28 in step S202. The remote-operated unit 34 receives data of the operation information 72 from the remote-operating unit 18 in step S2 and, in step S3, compares the operation information 72 with the remote-operation prohibited region set and registered into the remote-operation prohibited region table 52 in step S1 to decides whether the operation information 72 is within the remote-operation prohibited region or not. If the operation information is within the region, the procedure proceeds to step S4 to perform insert processing for passing the operation information to the OS 32. If the operation information is within the prohibited region, the operation information 72 is discarded without performing the insert processing to the OS 32 of step S4. Such processing of steps S2 to S4 is repeated until it is determined that the remote operation is terminated in step S5. If the termination of the remote operation is determined in step S5, a remote-operation termination notification 74 is sent to the remote-operating unit 18 to terminate a series of processing.

Figure 6:
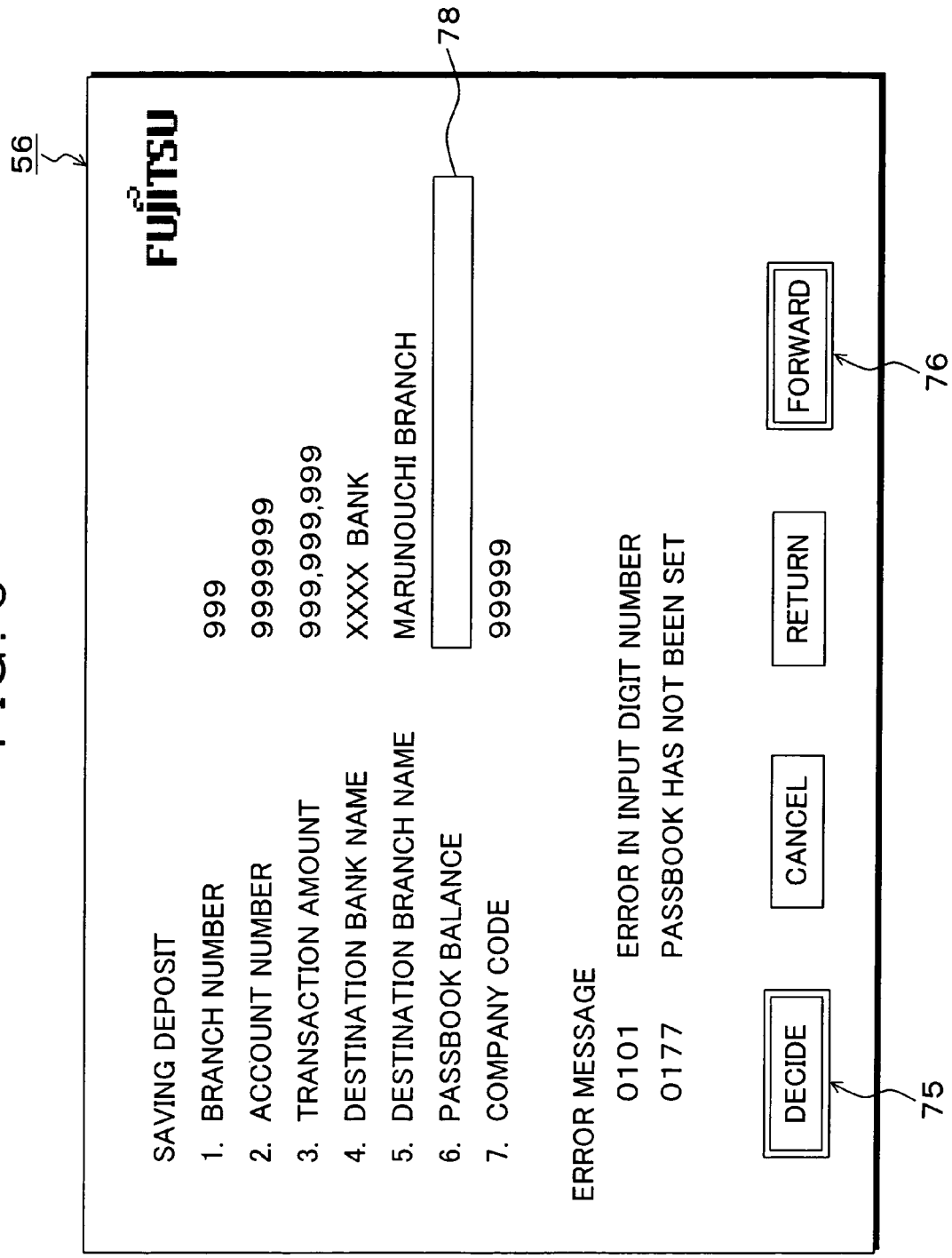
FIG. 6 is an explanatory view of a business screen recognizing and displaying operation prohibited regions managed according to the present invention.

FIG. 6 is an explanatory view of a business screen recognizing and displaying the remote-operation prohibited region managed by the remote-operation prohibited region management unit 50 of FIGS. 1A and 1B. The business screen 56 of FIG. 4 shown in the first embodiment is sent by the image-information transmission unit 48 in the user terminal apparatus 12 to the remote terminal apparatus 10 side to be displayed in a interlocked manner, however, in the business screen 56 such as FIG. 4, the support staff of the remote terminal apparatus 10 cannot recognize existence of the prohibited regions on the user terminal apparatus 12 side, and if the prohibited region is set to each operation button of "decide" and "forward", the support staff may perform unnecessary operation without recognizing the prohibited region. Therefore, in the business screen 56 of FIG. 6, if the remote-operation prohibited regions are set on the user terminal apparatus 12 side, colored operation prohibited regions 75, 76 are displayed using predetermined display color to enable the support staff to recognize that the operation prohibited regions are defined. Also, for information other than the operation button of the business screen 56, for example, for information which is not desirable to be watched by the support staff, a blind region 78 is set to, for example, a value of "passbook balance" in order not to show the content of the screen. Regarding to such display of the blind region 78, for example, each operation button of "decide" or "forward" may be hidden by defining as the blind region such that the button is not shown on the support staff side.

Figure 7:
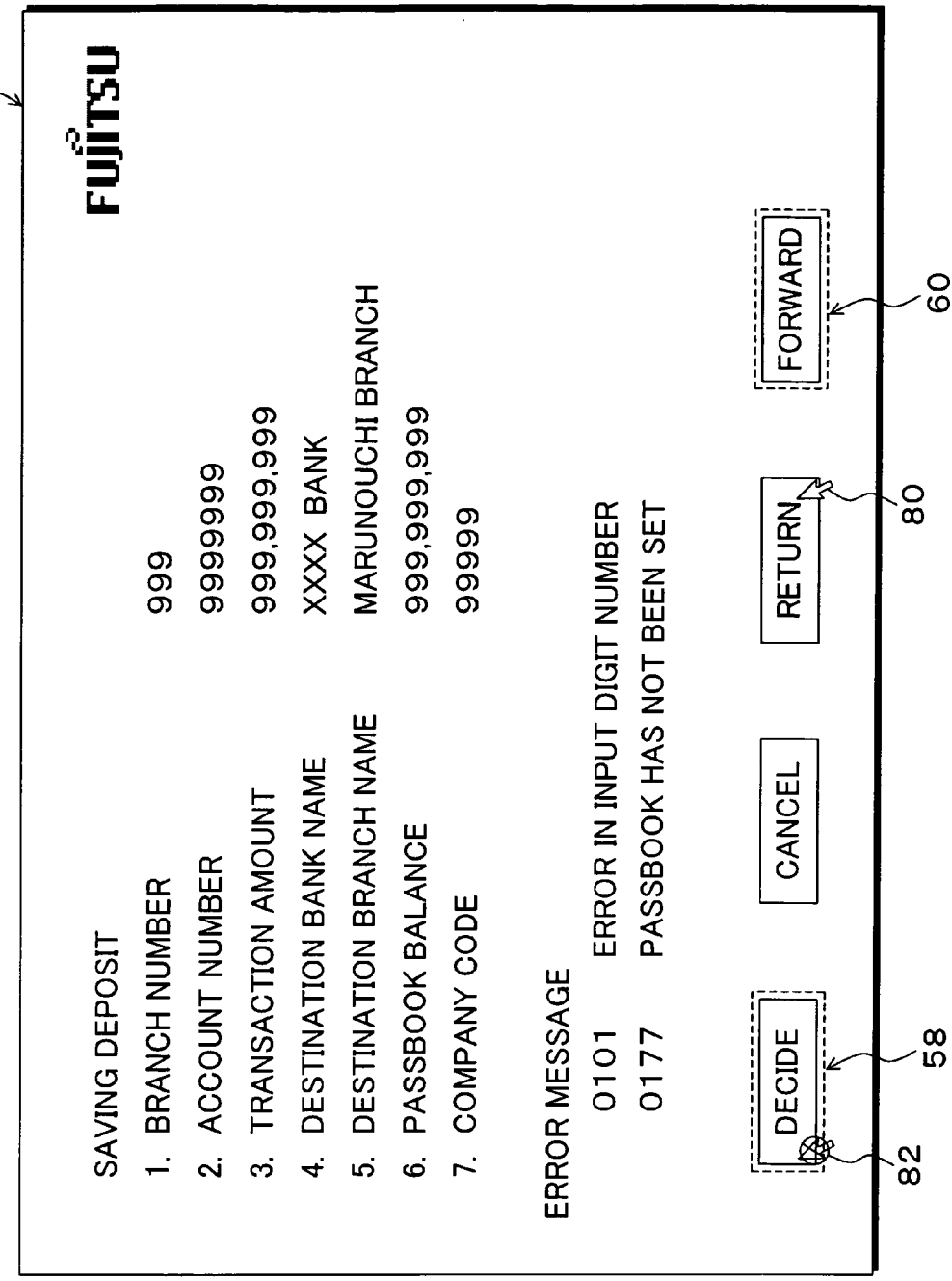
FIG. 7 is an explanatory view of a business screen changing a mouse cursor to operation-prohibited display within the operation prohibited region managed according to the present invention.

FIG. 7 is an explanatory view of a business screen changing a mouse cursor to operation-prohibited display within the remote-operation prohibited region managed by the remote-operation prohibited region management unit 50. In a business screen 56 of FIG. 7, the remote-operation prohibited regions 58, 60 are set to operation buttons "decide" and "forward" as shown in the business screen 56 of FIG. 4 and if nothing is done, the support staff on the remote terminal apparatus 10 side cannot find that the operation buttons are the remote-operation prohibited regions. Therefore, if a mouse cursor 80 located other than within the remote-operation prohibited regions is moved into the remote-operation prohibited region 58, the shape of the mouse cursor 80 is changed to a shape of a operation-prohibited mouse cursor 82 and thereby, it can be easily recognized that the remote-operation prohibited region has been set on the business screen 56. Similarly, if the mouse cursor 80 is moved to the position of the operation button "forward" to which the remote-operation prohibited region 60 is set, the mouse cursor 80 is switched to the display of the operation-prohibited mouse cursor 82.

FIG. 8 is an explanatory view of an operation prohibited region table used in a second embodiment of the remote operation of the present invention. The second embodiment of the present invention is characterized by that a remote-operation prohibited region for each business screen is preliminary registered into a remote-operation prohibited region table 52 and that when a business screen is displayed by a business program which is the business processing unit 38, comparison with the corresponding remote-operation prohibited region is performed by receiving notification of a screen number from the business processing unit 38 via the application program interface (API) of the remote-operated unit 34. The remote-operation prohibited region table 52 of FIG. 8 is constituted by screen numbers 84 set to a plurality of business screens, region numbers 54 of the remote-operation prohibited regions for each business screen and remote-operation prohibited regions 55 for registering upper-left coordinates and lower-right coordinates. This example shows an example of table registration for m screens which have the screen numbers 84 from #1 to #m. In the remote-operation prohibited region table 52 of the second embodiment, since the region numbers 54 and the remote-operation prohibited regions 55 are preliminary registered into the table independently from the business program and only the screen numbers 84 are notified from the business program correspondingly to the business screen currently displayed, in order to achieve the function of the remote-operated unit 34 of the present invention, necessary changes in the business program can be minimized as compared to the case of the first embodiment of FIG. 3 to FIGS. 5A and 5B.

Figure 9A:
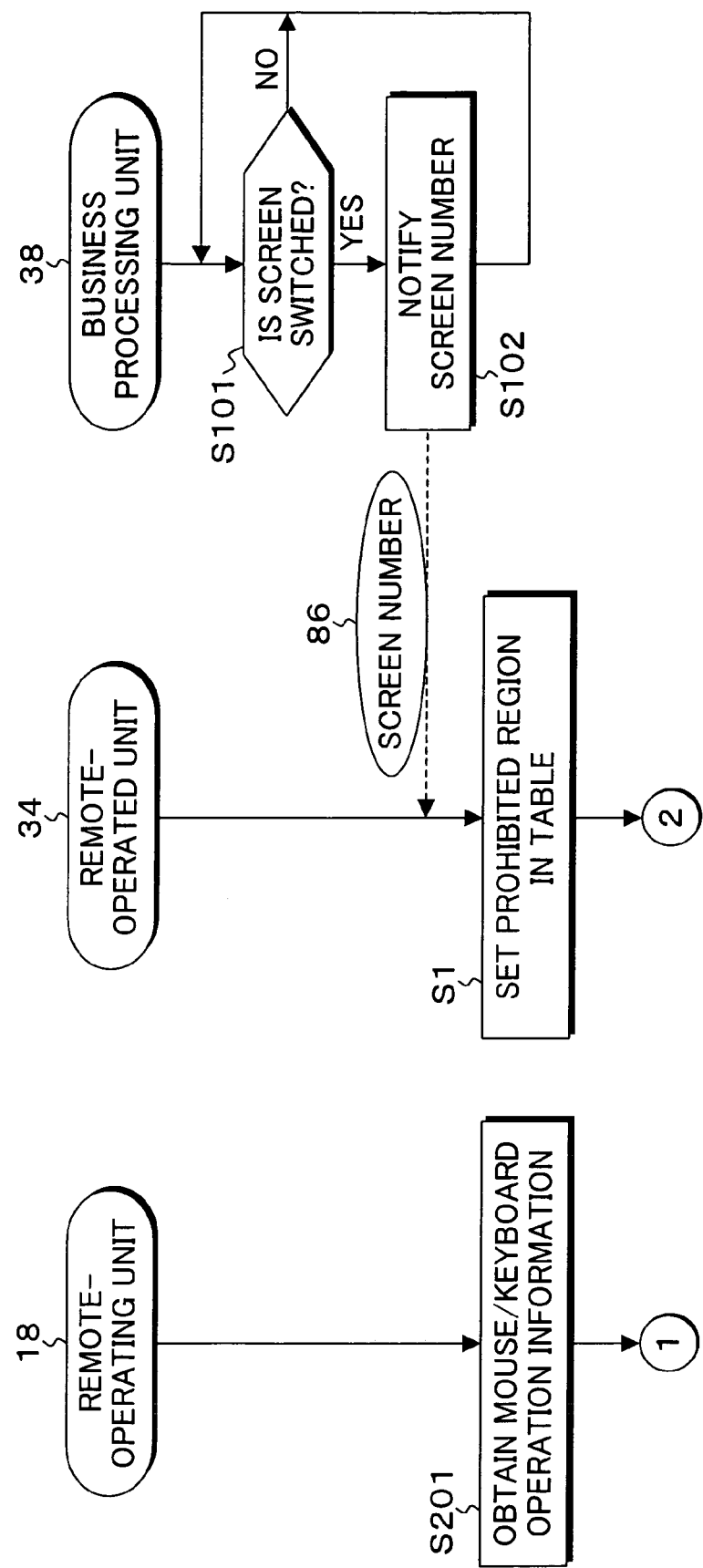
FIGS. 9A and 9B are time charts of the second embodiment of the present invention, receiving a notification of a screen number from a business program.
Figure 9B:
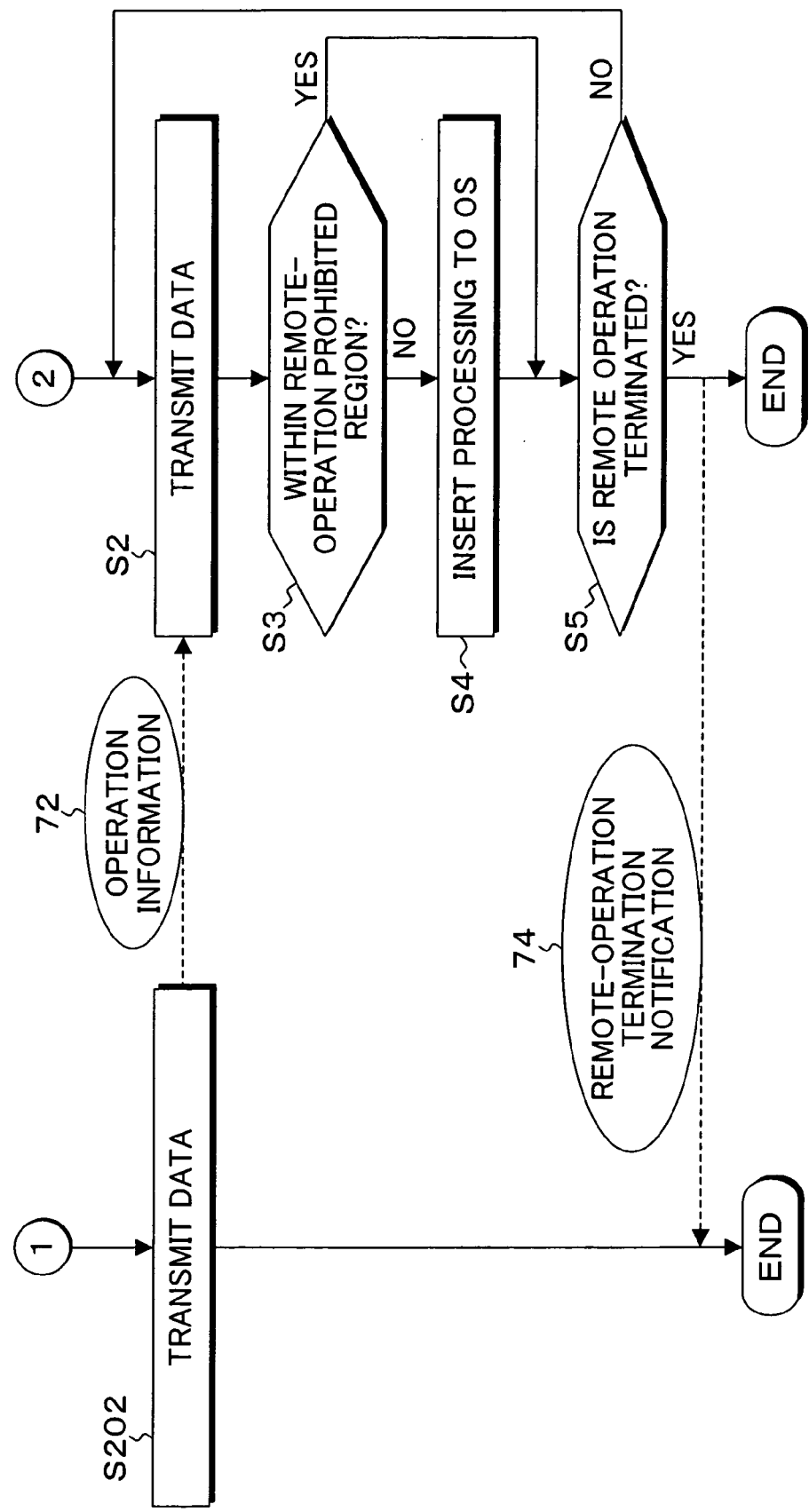

FIGS. 9A and 9B is a time chart of the second embodiment according to the present invention, receiving notification of the screen number from the business program. In FIGS. 9A and 9B, the business processing unit 38 of the user terminal apparatus 12 determines that a business screen is switched in step S101 and performs notification of the screen number 86 via the application program interface (API) of the remote-operated program 34 in step S102. The remote-operated unit 34 receives the notification of the screen number 86, refers to the remote-operation prohibited region table 52 and reads out the remote-operation prohibited regions with the region numbers included in the notified screen number 86 to be deployed on the RAM, for example. On the other hand, the remote-operating unit 18 of the remote terminal apparatus used by the support staff displays the same business screen as the display 40 of the user terminal apparatus 12 and if operation of the mouse or keyboard necessary for supporting is performed on this business screen, the operation information of the mouse or keyboard is obtained in step S201 and data transmission is performed to the remote-operated unit 34 in step S202 to send the operation information. The remote-operated unit 34 receives this operation information 72 in step S2, performs comparison to decide whether or not the operation information 72 is within the remote-operation prohibited regions of the currently displayed business screen deployed on the RAM and performs insert processing for passing the operation information to the OS 32 if the operation information is outside of the region, and consequently, processing of the business processing unit 38 is performed correspondingly to the operation information of the mouse or keyboard from the remote-operating unit 18, the result of which is reflected onto the screen. If the operation information 72 is within the remote-operation prohibited regions in step S3, the insert processing is not performed and is skipped, and the operation information 72 from the remote-operating unit 18 is discarded. Such processing of steps S2 to S4 is repeated until it is determined that the remote operation is terminated in step S5 and if the termination of the remote operation is determined, a remote-operation termination notification 74 is performed to the remote-operating unit 18 to terminate a series of processing.

FIG. 10 is an explanatory view of the remote-operation prohibited region table 52 used in the third embodiment of the remote operation according to the present invention. The third embodiment is characterized by that the table registration and determination of the remote-operation prohibited region is not dependent on the business program achieving the business processing unit 38. In FIG. 10, the remote-operation prohibited region table 52 of the third embodiment is constituted by screen numbers 84, screen identification characters 88, screen identification character coordinates 90, region numbers 54 and remote-operation prohibited regions 55. The screen identification characters 88 are registered as character strings which can identify a business screen among the business screens displayed by the business processing unit 38. For example, taking the business screen 56 of FIG. 11 as an example, "saving deposit" exists as the screen identification characters 92 which can identify the business screen 56, for example, and these characters are preliminary registered into the table as a value of the screen identification characters 88 of FIG. 10, to which #1 is added as the screen number 84. Also, as the screen identification character coordinates 90 for identifying the position of the screen identification characters 92 of FIG. 11, coordinate values of an upper-left coordinate point 92-1 and a lower-right coordinate point 92-2 are registered into the table. Based on such screen identification characters 88 and screen identification character coordinates 90 registered into the table, the business processing unit 38 extracts displayed character string from the position of the screen identification character coordinates 90 for the currently displayed business screen, compares the character string with the screen identification characters 88 registered into the table, identifies the currently displayed business screen if the character string and the screen identification characters 88 are matched, reads out remote-operation prohibited regions 55 with the region number 54 corresponding to the identified business screen, and decides whether or not the operation information of the mouse or keyboard sent from the remote-operating unit 18 is within the remote-operation prohibited regions.

Figure 12:
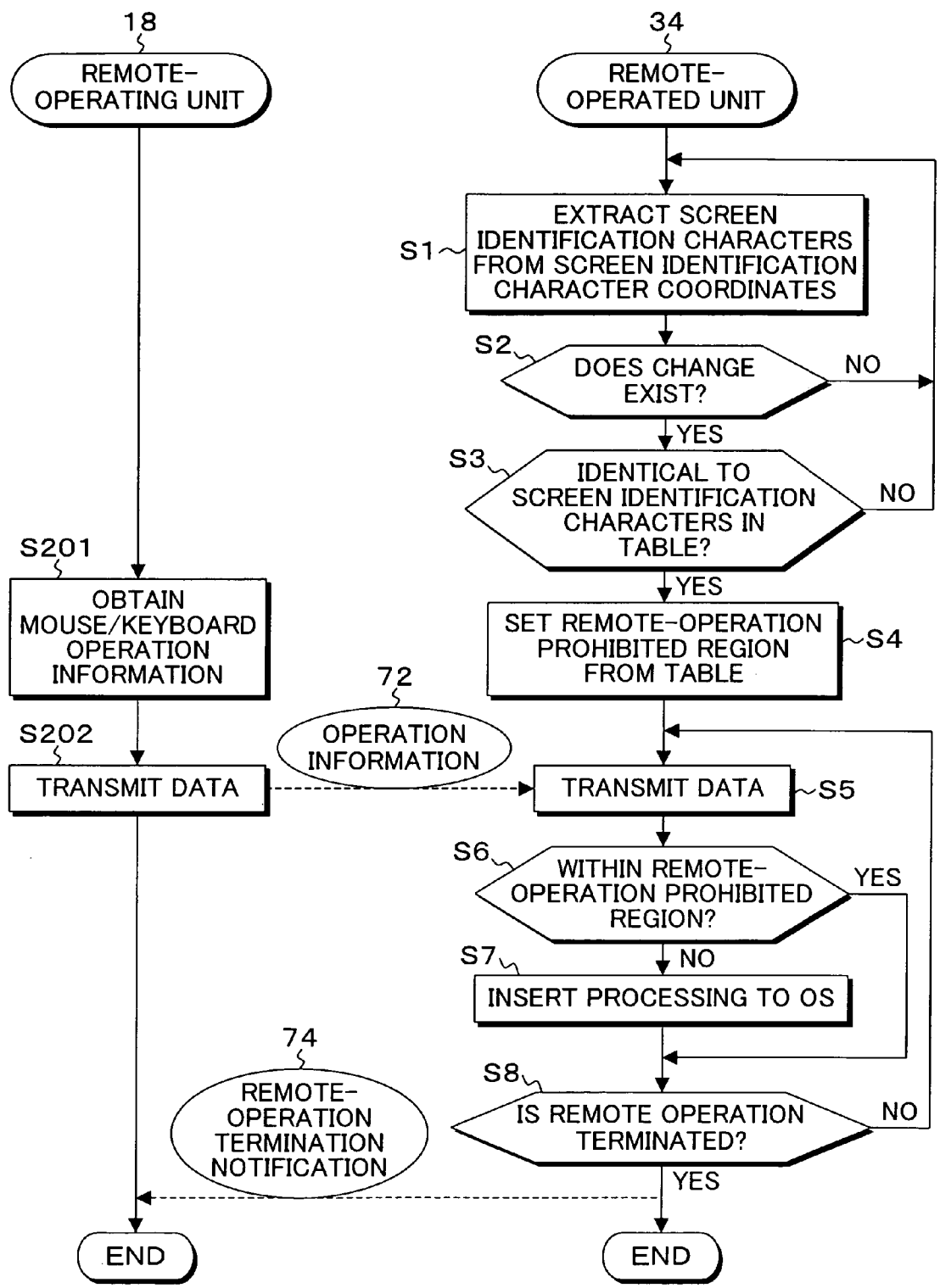
FIG. 12 is a time chart of the third embodiment of the present invention, identifying a business screen with extraction of screen identification characters to set a remote-operation prohibited region from the table.

FIG. 12 is a time chart of the third embodiment of the present invention, identifying a business screen with extraction of screen identification characters to set a remote-operation prohibited region from the table. In FIG. 12, the remote-operated unit 34 of the user terminal apparatus 12 extracts screen identification characters from the screen identification character coordinates 90 in step S1, determines that a business screen is switched in step S2 if the extracted screen identification characters are changed, and proceeds to step S3. In step S3, the extracted screen identification characters are compared with the screen identification characters of the table; if it is determined that the characters are matched, the procedure proceeds to step S4 to identify a value of the screen number 84 from the matched screen identification characters 88; the remote-operation prohibited regions 55 with the corresponding number 54 is read out to be deployed on the RAM; and operation information 72 of the mouse or keyboard sent from the remote-operating unit 18 is received in step S5 to decides whether the operation information is within the remote-operation prohibited regions or not in step S6. If the operation information is outside of the remote-operation prohibited regions, insert processing to the OS 32 is performed in step S7 and the business processing unit 38 executes processing corresponding to the operation of the mouse or keyboard from the remote-operating unit 18. If the operation information is within the remote-operation prohibited regions in step S6, the insert processing to the OS 32 is not performed in step S7 and the operation information 72 is discarded. Such processing of steps S5 to S7 is repeated until it is determined that the remote operation is terminated in step S8 and if the termination of the remote operation is determined, a remote-operation termination notification 74 is performed to the remote-operating unit 18 to terminate a series of processing. In the third embodiment of the present invention, as shown in the time chart of FIG. 12, since the remote-operated unit 34 does not receive notification from the business processing unit 38 at all and is not dependent on the business processing unit 38, the business processing unit 38, i.e., the business program does not have to be changed at all when the remote-operated unit 34 of the present invention is implemented in the user terminal apparatus 12, and the remote operation program constituting the remote-operated unit 34 for the user terminal apparatus 12 can be simply and easily implemented for achieving the remote operation of the present invention.

FIG. 13 is an explanatory view of a remote-operation prohibited region table 52 used in the fourth embodiment of the remote operation according to the present invention. Although the third embodiment of FIG. 10 to FIG. 12 extracts the identification characters displayed on a business screen in order to identify the business screen, the fourth embodiment is characterized by registering screen identification images displayed on business screens into a table in order to identify the business screens and comparing the images with screen identification images actually displayed on the business screens to identify the business screen. In the remote-operation prohibited region table 52 used in the fourth embodiment of FIG. 13, screen identification images 94 and screen identification image coordinates 96 are registered following to screen numbers 84.

FIG. 14 is an explanatory view of a target business screen 56 of the table registration of FIG. 13; the business screen 56 displays at upper right corner a screen identification image 98 which can identify the business screen; the screen identification image 98 is registered with, for example, a screen number 84 of #2 in FIG. 3; and at the same time, an upper-left coordinate point 98-1 and a lower-right coordinate point 98-2 are registered into the table as the screen identification image coordinates 96. Also, as the region number 54 and the remote-operation prohibited region 55 corresponding to the table registration of the screen identification image coordinates 96 of the business screen 56, upper-left coordinates and lower-right coordinates are registered for remote-operation prohibited regions 58, 60 which is set to each of operation buttons "decide" and "forward".

Figure 15:
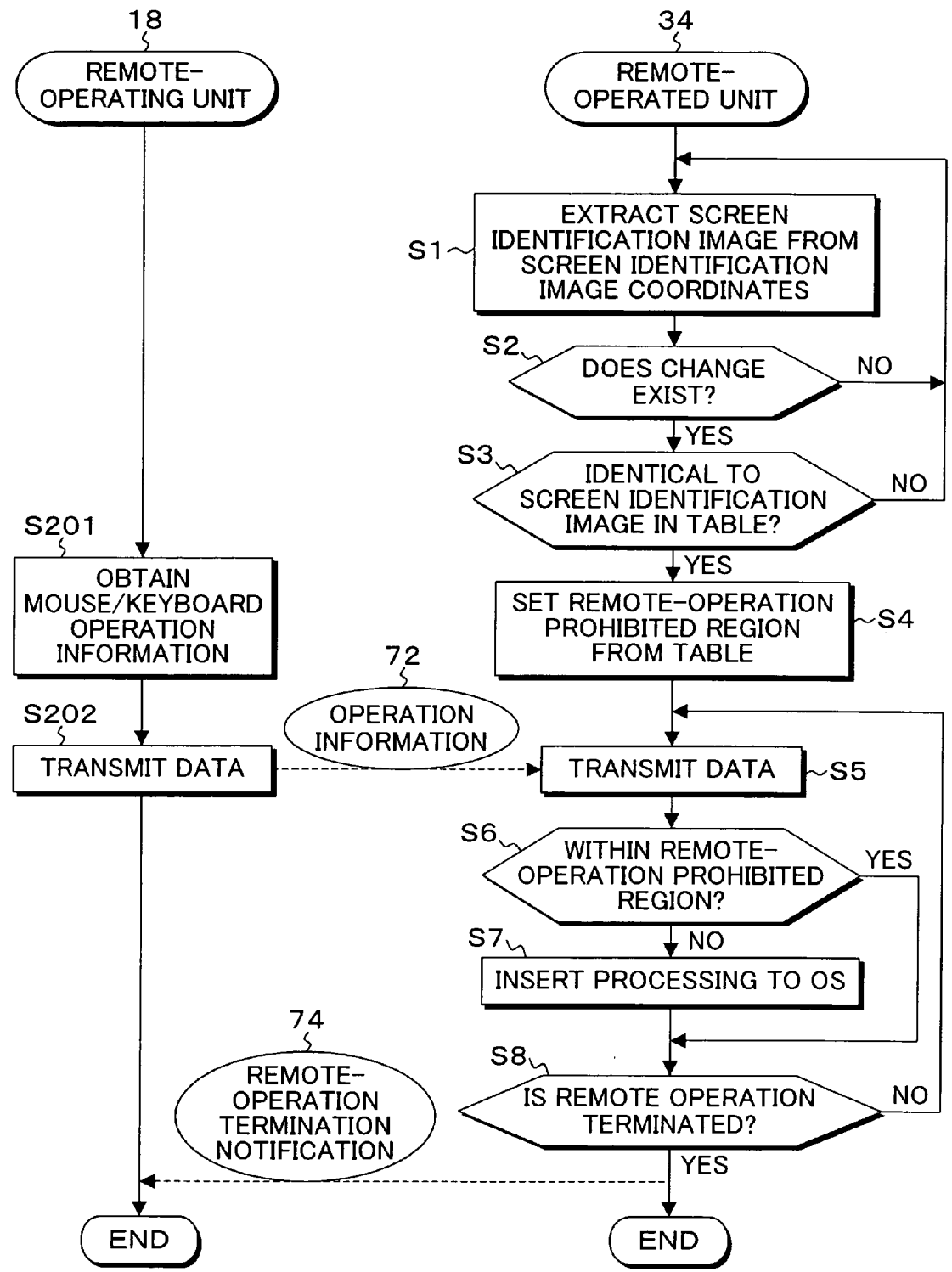
FIG. 15 is a time chart of the fourth embodiment of the present invention, identifying a business screen with extraction of a screen identification image to set a remote-operation prohibited region from the table.

FIG. 15 is a time chart of the fourth embodiment of the present invention, identifying a business screen with extraction of a screen identification image to set a remote-operation prohibited region from the table. In FIG. 15, the remote-operated unit 34 extracts the screen identification image from the screen identification image coordinates for a business screen displayed on the display in step S1 and determines whether the screen identification image is changed or not in step S2. If the screen identification image is changed, it is determined that the business screen is switched, and the screen identification image is compared with the screen identification images registered into the table of FIG. 14 to determine whether the images are matched in step S3. If it is determined that the screen identification image is matched with any one of the screen identification images registered into the table, the screen number of the business screen is identified from the matched screen identification image to read out the corresponding remote-operation prohibited regions to be deployed on the RAM in step S4. In this state, when operation information 72 of the mouse or keyboard is received from the remote-operating unit 18 for remote operation in step S5, it is checked whether the operation information is within the remote-operation prohibited regions deployed on the RAM in step S6, and if the operation information is outside of the remote-operation prohibited regions, insert processing to the OS 32 is performed for the operation information 72 of the mouse or keyboard in step S7 to allow the business processing unit 38 to execute processing based on the operation information from the remote-operating unit 18. If the operation information is within the remote-operation prohibited regions in step S6, the insert processing to the OS 32 is not performed in step S7 and the operation information 72 is discarded. Such processing of steps S5 to S7 is repeated until it is determined that the remote operation is terminated in step S8 and if the termination of the remote operation is determined, a remote-operation termination notification 74 is performed to the remote-operating unit 18 to terminate a series of processing. Also in the fourth embodiment of the present invention shown in the time chart of FIG. 15, the remote-operated unit 34 does not have to link up with the business program achieving the business processing unit 38 and the program achieving the remote-operated unit 34 can be simply and easily implemented in the user terminal apparatus 12 for achieving the remote operation of the present invention without changing the business program.

Although the embodiments described above are examples of the case of prohibiting unauthorized use when supporting the business program of banking business, the present invention is not limited to these and the present invention can be directly applied to any business programs with displayed contents which are wanted to be prohibited from being operated by a support staff. Also, the present invention provides a remote-operation program which acts as the remote-operated unit 34, installed into the user terminal apparatus 12 of FIGS. 1A and 1B and the program is comprised of the contents of the flowcharts of the remote-operating unit 18 shown in each embodiment of FIGS. 5A and 5B, FIGS. 9A and 9B, FIG. 12 and FIG. 15. The present invention encompasses any modifications without impairing the object and advantages thereof and is not limited by numeric values shown in the embodiments described above.

What is claimed is:

1. A non-transitory computer-readable storage medium which stores a program for driving a computer of a terminal apparatus remote-operated through a network from a remote terminal apparatus which support the computer of a terminal apparatus to execute:

an image information transmission step of sending image information of a changed portion to the remote terminal apparatus to display the screen is locked or not functional when a change is detected in the screen displayed by business processing; an operation information reception step of receiving remote operation information from the remote terminal apparatus; and an operation prohibited region management step of setting an operation prohibited region for the remote terminal apparatus on the business screen and for prohibiting operation by the remote terminal apparatus if the remote operation information received in the operation information reception step is within the operation prohibited region, wherein the operation prohibited region management step registers into a table the remote-operation prohibited region notified every time the business screen is switched and displayed by business processing, and discards the remote operation information if the remote operation information received in the operation information reception step is within the remote-operation prohibited region registered in the table, or executes processing based on the remote operation information if the remote operation information is outside of the remote-operation prohibited region, wherein the operation prohibited region management step preliminarily registers a screen identifier being able to identify at least a business screen, and the remote-operation prohibited region into a table for each business screen displayed by the business processing, and reads out the remote-operation prohibited region of a corresponding business screen from the table with the screen identifier notified every time the business screen is switched and displayed by business processing to discard the remote operation information if the remote operation information received in the operation information reception step is within the remote-operation prohibited region, or to execute processing based on the remote operation information if the remote operation information is outside of the remote- operation prohibited region.

2. The non-transitory computer-readable storage medium according to claim 1, wherein the operation prohibited region management step uses a screen number as the screen identifier.

3. The non-transitory computer-readable storage medium according to claim 1, wherein the operation prohibited region management step preliminarily registers screen identification information on a screen being able to identify at least a business screen, coordinate information identifying a display position of the screen identification information and the remote-operation prohibited region into a table for each business screen displayed by business processing, and reads out the corresponding remote-operation prohibited region by comparing screen identification information extracted from the business screen with the screen identification information in the table every time the business screen is switched and displayed by business processing to discard the remote operation information if the remote operation information received in the operation information reception step is within the remote-operation prohibited region, or to execute processing based on the remote operation information if the remote operation information is outside of the remote-operation prohibited region.

4. The non-transitory computer-readable storage medium according to claim 3, where in the operation prohibited region management step uses a screen identification character string which can identify the business screen as the screen identification information.

5. The non-transitory computer-readable storage medium according to claim 3, wherein the operation prohibited region management step uses a screen identification image which can identify the business screen as the screen identification information.

6. The non-transitory computer-readable storage medium according to claim 1, wherein the operation prohibited region management step allows existence of the remote-operation prohibited region to be recognized and displayed on the business screen.

7. The non-transitory computer-readable storage medium according to claim 6, wherein the operation prohibited region management step performs setup of specific color, blind display or display of a mouse cursor changed to a non-operational shape as the recognizable display of the remote-operation prohibited region on the business screen.

8. A remote operation method of a terminal apparatus remote-operated through network from a remote terminal apparatus which support the computer of a terminal apparatus, wherein a computer of the terminal apparatus is forced to execute: an image information transmission step of sending image information of a changed portion to the remote terminal apparatus to display the screen is locked or not functional when a change is detected in the screen displayed by business processing;

an operation information reception step of receiving remote operation information from the remote terminal apparatus; and an operation prohibited region management step of setting a remote-operation prohibited region for the remote terminal apparatus on the business screen and for prohibiting operation by the remote terminal apparatus if the remote operation information received in the operation information reception step is within the remote-operation prohibited region, wherein the operation prohibited region management step registers into a table the remote-operation prohibited region notified every time the business screen is switched and displayed by business processing, and discards the remote operation information if the remote operation information received in the operation information reception step is within the remote-operation prohibited region registered in the table, or executes processing based on the remote operation information if the remote operation information is outside of the remote-operation prohibited region:, wherein the operation prohibited region management step preliminarily registers a screen identifier being able to identify at least a business screen, and the remote-operation prohibited region into a table for each business screen displayed by the business processing, and reads out the remote-operation prohibited region of a corresponding business screen from the table with the screen identifier notified every time the business screen is switched and displayed by business processing to discard the remote operation information if the remote operation information received in the operation information reception step is within the remote-operation prohibited region, or to execute processing based on the remote operation information if the remote operation information is outside of the remote-operation prohibited region.

9. The remote operation method of claim 8, wherein the operation prohibited region management step uses a screen number as the screen identifier.

10. The remote operation method of claim 8, wherein the operation prohibited region management step preliminarily registers screen identification information on a screen being able to identify at least a business screen, coordinate information identifying a display position of the screen identification information and the remote-operation prohibited region into a table for each business screen displayed by business processing, and reads out the corresponding remote-operation prohibited region by comparing screen identification information extracted from the business screen with the screen identification information in the table every time the business screen is switched and displayed by business processing to discard the remote operation information if the remote operation information received in the operation information reception step is within the remote-operation prohibited region, or to execute processing based on the remote operation information if the remote operation information is outside of the remote-operation prohibited region.

11. The remote operation method of claim 10, wherein the operation prohibited region management step uses a screen identification character string which can identify the business screen as the screen identification information.

12. The remote operation method of claim 8, wherein the operation prohibited region management step uses a screen identification image which can identify the business screen as the screen identification information.

13. The remote operation method of claim 8, wherein the operation prohibited region management step allows existence of the remote-operation prohibited region to be recognized and displayed on the business screen.

14. The remote operation method of claim 8, wherein the operation prohibited region management step performs setup of specific color, blind display or display of a mouse cursor changed to a non-operational shape as the recognizable display of the remote-operation prohibited region on the business screen.

* * * * *

UNITED STATES PATENT AND TRADEMARK OFFICE
CERTIFICATE OF CORRECTION

PATENT NO.           : 7,925,714 B2
APPLICATION NO.      : 11/285182
DATED                : April 12, 2011
INVENTOR(S)          : Hajime Kamata It is certified that error appears in the above-identified patent and that said Letters Patent is hereby corrected as shown below:

Column 13, Line 10-16, In Claim 1, delete "an image information transmission step of sending image information of a changed portion to the remote terminal apparatus to display the screen is locked or not functional when a change is detected in the screen displayed by business processing; an operation information reception step of receiving remote operation information from the remote terminal apparatus; and" and insert --an image information transmission step of sending image information of a changed portion to the remote terminal apparatus to display the screen is locked or not functional when a change is detected in the screen displayed by business processing;
an operation information reception step of receiving remote operation information from the remote terminal apparatus; and--, therefor.

Column 13, Line 49, In Claim 1, delete "remote- operation" and insert --remote-operation--, therefor.

Column 14, Line 9, In Claim 4, delete "where in" and insert --wherein--, therefor.

Column 14, Line 18-22, In Claim 6, delete "The non-transitory computer-readable storage medium according to claim 1, wherein the
operation prohibited region management step allows existence of the remote-operation prohibited region to be recognized and displayed on the business screen." and insert --The non-transitory computer-readable storage medium according to claim 1, wherein the operation prohibited region management step allows existence of the remote-operation prohibited region to be recognized and displayed on the business screen.--, therefor.

Column 14, Line 58, In Claim 8, delete "region:," and insert --region,--, therefor.

Column 15, Line 3, In Claim 8, delete "remote- operation" and insert --remote-operation--, therefor.

Signed and Sealed this
Eighteenth Day of October, 2011

David J. Kappos
*Director of the United States Patent and Trademark Office*